United States Patent [19]

Rzeszewski

[11] 3,867,010

[45] Feb. 18, 1975

[54] VERTICAL INTERVAL REFERENCE SIGNAL EXTRACTION CIRCUIT ARRANGEMENT

[75] Inventor: Theodore S. Rzeszewski, Lombard, Ill.

[73] Assignee: Motorola, Inc., Chicago, Ill.

[22] Filed: July 2, 1973

[21] Appl. No.: 375,981

[52] U.S. Cl. .................................... 358/10, 358/28

[51] Int. Cl. ............................................ H04n 9/62

[58] Field of Search ...... 178/5.4 R, 5.4 TE, 5.4 HE, 178/5.4 SY; 358/10, 28

[56] References Cited

UNITED STATES PATENTS

| | | | |
|---|---|---|---|
| 3,673,320 | 6/1972 | Carnt | 178/5.4 HE |
| 3,730,984 | 5/1973 | Smith | 178/5.4 TE |
| 3,780,218 | 12/1973 | Rennick | 178/5.4 HE |

*Primary Examiner*—Richard Murray

*Attorney, Agent, or Firm*—Mueller, Aichele & Ptak

[57] ABSTRACT

A signal extraction circuit for extracting desired reference information from a base signal, such as a composite television signal. The circuit arrangement is particularly useful in extracting the Vertical Interval Reference (VIR) signal which is customarily included at line 20 in both television fields. The circuit arrangement includes a detector to respond to the color burst segments of the composite signal. The color bursts are converted to pulses and utilized to condition a counter to begin counting to a preselected count level or number following the resumption of color bursts after the vertical interval. Upon reaching the set count level, a control signal is generated to switch on a bistable device or the like to provide an appropriate gating signal time-coincident with the desired reference signal information to be extracted. The amount of reference information extracted is made adjustable by controlling the width of the gating signal. Accordingly, any or all of the reference information may be extracted from the associated horizontal line interval of the composite television signal.

8 Claims, 4 Drawing Figures

COMPOSITE COLOR TELEVISION SIGNAL

—VIR SIGNAL—

VERTICAL INTERVAL REFERENCE SIGNAL EXTRACTION CIRCUIT ARRANGEMENT

BACKGROUND OF THE INVENTION

The present invention relates generally to signal extraction circuits and, more particularly, to improved circuit apparatus for accurately and reliably extracting a desired signal, or any selected part thereof, from the vertical interval of a composite color television signal.

The Vertical Interval Reference (VIR) Signal, formulated by the Broadcast Television Systems of the EIA, is a special signal for insertion at the television signal transmitting site during the vertical interval of a television program signal. It has been proposed as a standard to assist television operators in adjusting various signal parameters, such as chroma and luminance levels, or providing a frequency comparison for the color burst segments, as well as other functions. In this way different program segments will have similar amplitude and phase characteristics, and changes in the various parameters will not occur at the receiver location when changing from station to station, or from scene to scene on the same channel, or perhaps, when changing from live telecasts to taped matter, and vice versa.

Usually, the VIR signal is included with the program color burst at approximately line 20 of both television fields. While designed specifically for use at the television transmitting sites, this VIR signal is nevertheless useful at the user or receiver locations for a variety of operational and testing functions. For example, the VIR signal may be suitably extracted from the received composite television signal and utilized in an automatic hue control arrangement for the television receiver. The frequency of the chroma reference portion of the VIR signal is the same as that of the chroma subcarrier and its phase is the same as that of the color burst signal segment. Hence, it can be compared with one of the derived color representative signals . . . for example, R–Y. If the two signals, in quadrature with one another, are then compared, say in a differential amplifier circuit, correct hue setting will be indicated whenever there is zero amplitude current in the output circuits thereof, as may be conveniently indicated by a simple metering device or the like.

There are still other applications to which the VIR signal may be useful and which will be readily apparent to those skilled in the art. However, to utilize such VIR signal information, it must first be extracted from the received composite television signal. Further, it must be extracted with a great deal of precision and accuracy if undesired portions of the blanking and/or program color burst information are to be kept separate and apart therefrom.

There are known signal extraction circuits, of course. Their field of utilization include areas other than just television applications. However, all such prior circuit arrangements are characterized by their complexity and high cost. Moreover, they leaave something to be desired in terms of overall reliability and accuracy. And, additionally, none are known which include the capability of precisely controlling the amount of signal that may be extracted, that is, either the full horizontal line (i.e., line 20), or only a portion thereof.

SUMMARY OF THE INVENTION

Accordingly, it is an object of the present invention to provide a circuit arrangement for extracting reference information from a base signal without the foregoing enumerated operational deficiencies.

A more particular object of the present invention is to provide a simple but highly reliable circuit arrangement for extracting desired reference signal information from the vertical interval of a conventional composite television signal.

Another object of the present invention is to provide an improved signal extraction circuit of the foregoing type wherein the signal to be extracted is accurately and automatically gated in at a prescribed time to avoid inclusion of undesired base signal components.

Still another object of the present invention is to provide an improved signal extraction circuit of the foregoing type for extracting a VIR signal from a received composite television signal and wherein the color burst signal component may be utilized to initiate the desired signal extraction process without itself being included in the signal so extracted.

Yet another object of the present invention is to provide an improved signal extraction circuit of the foregoing type for extracting all, or a portion, of a VIR signal included at a particular line in one or both television fields of a received composite television signal.

In one aspect of a preferred embodiment of the invention, a detector is utilized to sense the presence of the color burst segments of the received composite television signal, which are then limited and applied to a retriggerable monostable with a time period in excess of one horizontal time interval. Accordingly, the monostable will remain in one fixed state as long as the color bursts occur at the set horizontal frequency rate. However, during the vertical time interval, the color bursts are not present and the retriggerable monostable is allowed to change or revert to its low level state. This action may be utilized to condition a counter arrangement to begin counting upon the resumption of the color burst signal following such time interval. It also activates a further monostable device which exhibits a time period which at least encompasses the counting time period of the associated counter. This time period may be conveniently adjusted within a range of one horizontal line interval.

Upon the counter reaching its preset level of counting, an output pulse is applied to a gating arrangement, such as a bistable device, which also receives an output signal from the monostable with adjustable time period. Accordingly, a gating signal is thus generated upon the counter reaching its assigned count level, which gating signal remains until the second monostable device reverts to its fundamental state. This gating signal may then be utilized in conjunction with a composite video signal, say any suitable analog gate, to effect the actual extraction of the desired VIR signal which is time-coincident with a gating signal generated at the output of the bistable device.

BRIEF DESCRIPTION OF THE DRAWINGS

The features of the present invention which are believed to be novel are set forth with particularity in the appended claims. The invention itself, however, together with further objects and advantages thereof, may be best understood by reference to the following description when taken in conjunction with the accompanying drawings, in which:

DESCRIPTION OF THE PREFERRED EMBODIMENT

Figure 1:
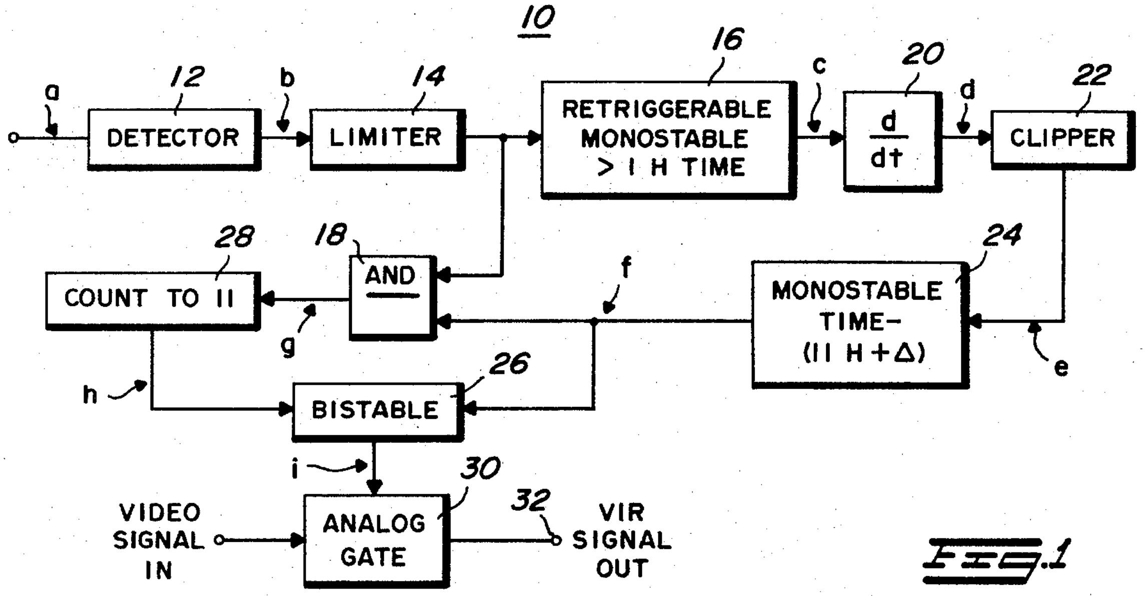
FIG. 1 is a block diagram of a signal extraction circuit arrangement constructed in accordance with the present invention.

Referring now to the drawings, a block diagram of a signal extraction circuit 10 is shown in FIG. 1 which has been constructed in accordance with the present invention. Circuit 10 may be conveniently utilized to extract all or any part of the VIR signal inserted at predetermined locations in respective television fields of a conventional composite color television signal. As mentioned previously, this VIR signal is customarily located at about lines 20, but in any event, within the vertical interval specified for the composite television signal.

Figure 3:
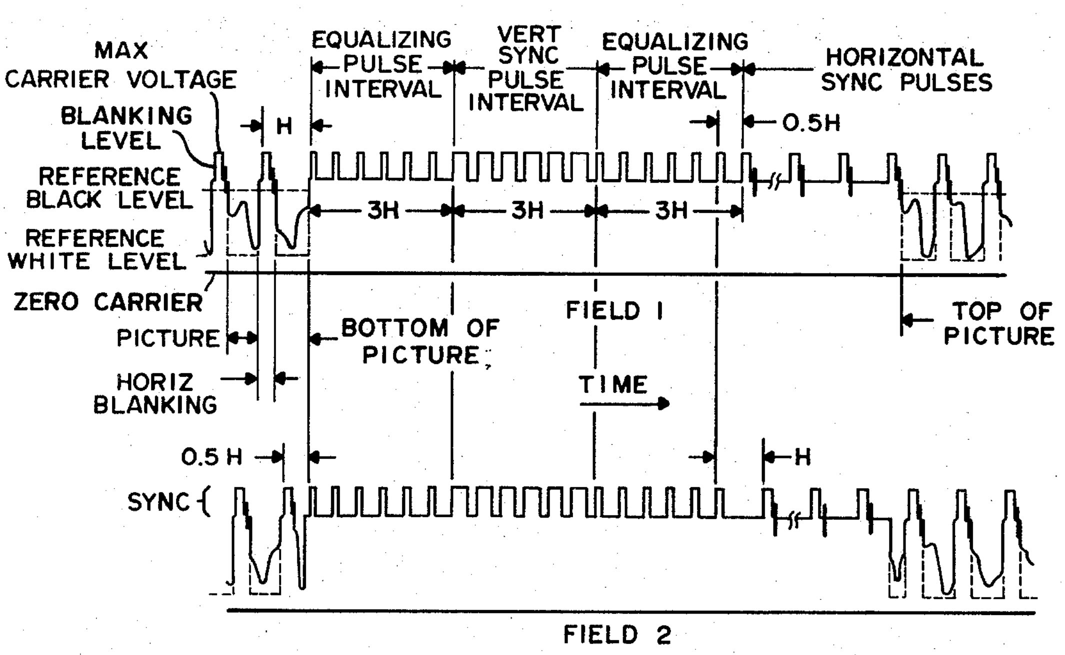
FIG. 3 is a graphic representation of a conventional composite color television signal showing, inter alia, the vertical interval of such signal.

FIG. 3 graphically illustrates various parameters of the conventional composite color television signal. From the bottom of the reproduced image on the television screen to the top thereof, there is a period corresponding to some 21 horizontal line intervals (21 H). Equalizing and vertical sync pulse information is included within this time frame (approximately 9 H), during which there is no color signal bursts present on the back porch of the horizontal blanking pedestal.

Figure 4:
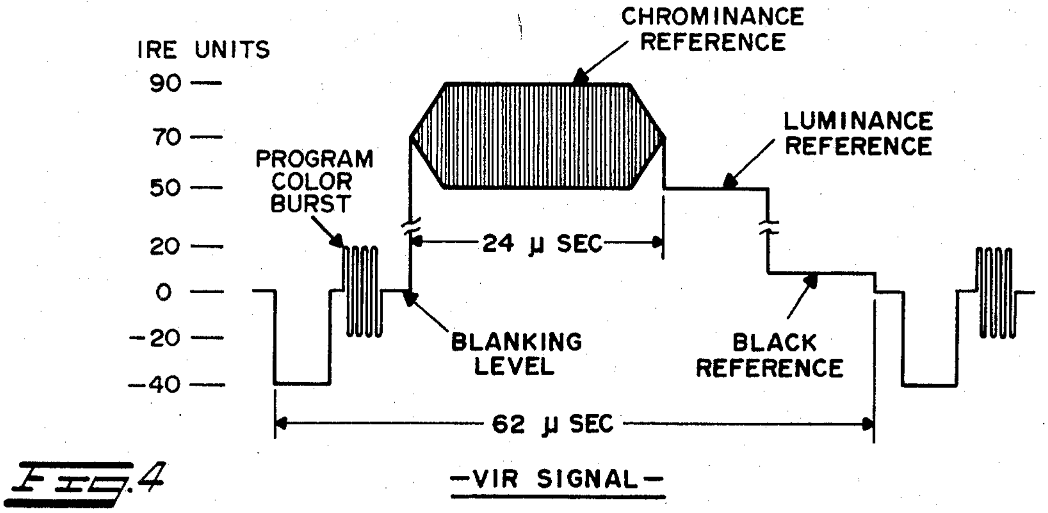
FIG. 4 is a graphic representation of the characteristics of the VIR signal as presently proposed for inclusion at selected locations within the respective television fields.

The Vertical Interval Reference Signal is depicted graphically in FIG. 4. As indicated, the signal includes reference signal information for setting chrominance, luminance, black level and blanking level. The signal has been kept relatively simple with the view that it may be easily observed and interpreted. The individual components thereof represent as far as practical typical program levels rather than extreme or peak values. As indicated, the first 24 microseconds of the VIR signal is a chorminance reference of some 40 IRE units superimposed on a luminance pedestal of 70 IRE units. The luminance value of 70 IRE units corresponds more or less to the average skin tone luminance that one would expect to encounter in the typical telecast. In any event, the frequency and phase of the chroma reference is the same as that of the color burst of the program signal.

Referring back to FIG. 1, the circuit arrangement 10 for extracting this VIR signal may include a peak detector 12 for responding to the color burst signal of the composite color television signal. The extracted color burst are then applied to a limiter stage 14 which limits the color bursts to essentially pulse waveforms of predetermined amplitude. The output of the limiter is applied to a retriggerable monostable device 16 and also to an AND gate 18.

Retriggerable monostable 16 is designed to exhibit a time period which is slightly in excess of one horizontal line interval of 1 H. Accordingly, as long as detected and limited color burst pulses are received from limiter 14, monostable 16 will remain in its excited or high level state, as depicted by the waveform *c* illustrated in FIG. 2. Monostable device 16 is permitted to return to its natural or low level state only when there is an absence of detected color bursts within the referenced vertical interval for more than 1 H time period.

The output of retriggerable monostable device 16 is coupled to a differentiating circuit arrangement 20, the output of which is coupled to a clipper 22. The output of clipper 22 is then coupled to a second monostable device 24. As indicated, the output of monostable 24 forms the other input to AND gate 18. It is also coupled to one of the two inputs of a bistable device 26.

Monostable 24 is designed to exhibit a time period of which encompasses some eleven horizontal line intervals (11 H) plus an additional time interval designated as "Δ". The total time period, then, is 11 H + Δ, as indicated. This additional time interval Δ is adjustable over a predetermined increment as will be explained more fully subsequently.

The output of AND gate 18 is connected directly to the input of counter 28 which has been set to count some predetermined number of pulses, or in the present case a total of 11, and then provide an output pulse or control signal of a relatively short duration to the other of the two inputs to bistable 26. The output of bistable 26 is a gating signal which is time co-incident with the desired VIR signal in the composite television signal. Accordingly, when the gating signal from bistable 26 and the composite television signal (FIG. 3) are coupled to a suitable analog gate arrangement, such as that identified at reference 30, the VIR signal is "gated out" or extracted and appears at the output terminal 32 thereof.

Figure 2:
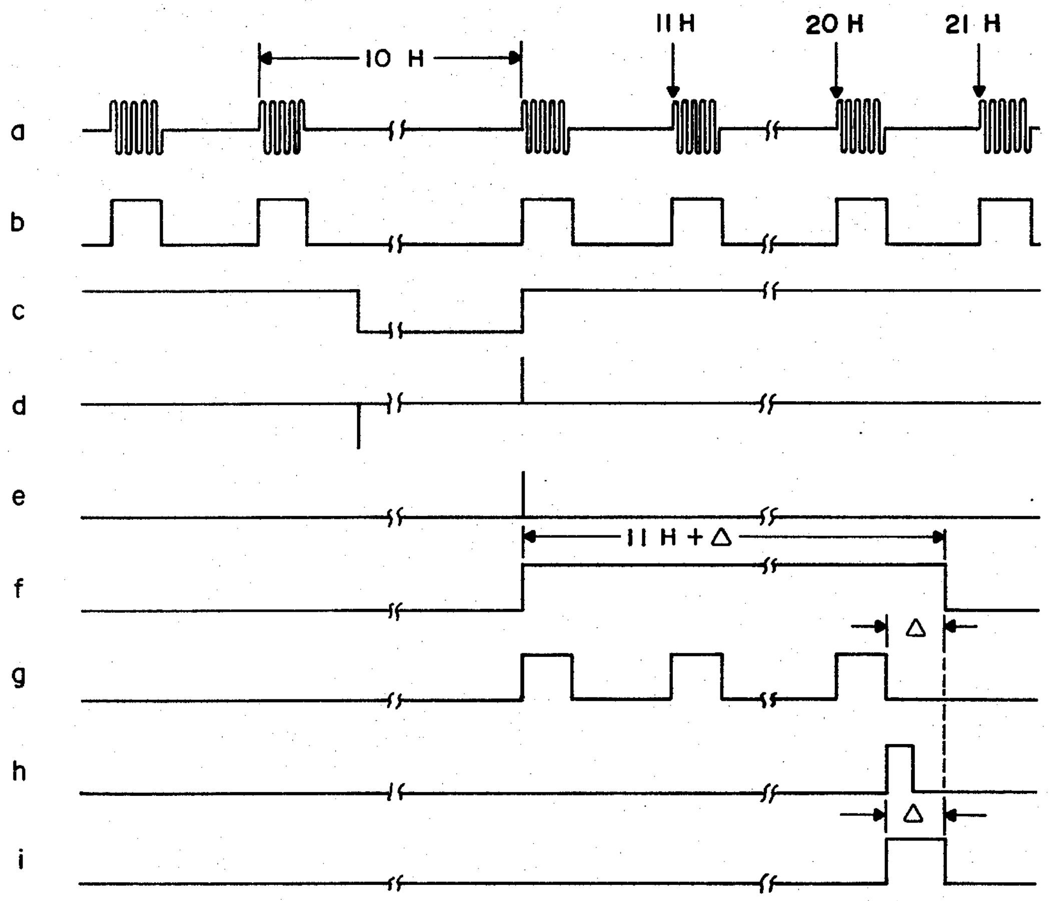
FIG. 2 is a series of waveforms generated at selective locations within the extraction circuit of FIG. 1, which waveforms are useful in understanding the operational characteristics.

In operation, the composite television signal as depicted in FIG. 3 is applied to the input of the peak detector 12 which then responds to and separates out the respective color burst segments as represented by the waveform *a* in FIG. 2. Limiter 14 amplifies and limits the same to that as shown by the waveform *b*. As long as the color burst segments are being received and detected, retriggerable monostable 16 remains in the activated or "on" state, since its time period is purposefully made greater than the set horizontal frequency rate, or 1 H. This is represented graphically by the waveform *c*. During the vertical interval of the composite television signal, of course, the color burst segments cease and monostable 16 is permitted to switch or revert to its normal low level state. It again switches to its "on" or high level state when the color bursts resume some nine horizontal line intervals, or 9 H, later.

As indicated by waveform *d*, this change of level or states by monostable 16 is differentiated into two sharp voltage spikes, one negative-going and one positive going. Clipper 22, however, removes or blocks out the negative-going voltage spike to derive the waveform *e*. This voltage spike in time co-incidence with the first of the resumed color burst segments in the composite television signal is utilized to switch or gate on monostable device 24. The switch-on of monostable device 24 effectively conditions or activates counter 28 to initiate counting. That is, the change in level in monostable 24 causes an increase in the voltage level applied to the associated input of AND gate 18. Since the other input of AND gate 18 is coupled to the output of limiter 14, it will be appreciated that a corresponding input is applied to counter 28 for each pulse generated at the output of limiter 14. Each such generated pulse corresponds to a detected color burst signal. When counter 28 reaches its preset counting level, i.e., a count of 11, an output will be produced in the form of a pulse or control signal of relatively narrow width, such as depicted by waveform *h*, FIG. 2. This signal, upon being applied to one input of bistable 26, is effective to cause it to switch states and produce an appropriate gating signal at its output, as indicated by the waveform *i*, FIG. 2. This gating signal remains "on" until bistable 26 is switched over by the falling or trailing edge of waveform *f* as monostable device 24 reaches the end of its time period and reverts to its initial state.

As mentioned previously, the time at which monostable 24 reverts or turns off relative to its turn-on time can be adjusted through an increment Δ corresponding to approximately one horizontal line interval (1 H). This turn-off time may be conveniently controlled by a simple time constant arrangement, such as a R–C netowrk with adjustable resistance (not shown). In any event, with the aforementioned time constant adjustment, represented by Δ in FIG. 2, the extent or duration of the gating signal can be made to cover any or all of the referenced signal information in the designated (line 20) interval. For example, by adjusting the trailing edge of the pulse produced by monostable 24, the width of the gating pulse can be made to cover slightly more than 24 microseconds and, thus, it will be in time-coincidence with or cover only the chrominance reference segment of the VIR signal.

It might also be mentioned that if it is desired to monitor or extract some portion of the VIR signal not coincident with the beginning thereof, say for example, the luminance or black level references as seen in FIG. 4, then it may be necessary to control in some manner the leading edge of the waveform generated by monostable 24, as well as controlling its trailing edge. This can be readily accomplished, for example, by utilizing a sampling device to which the output signal from monostable 24 may be applied. The sampler device may then have a delay which can be effectively controlled by a time constant arrangement similar to that referenced for monostable 24. By suitably adjusting the desired delay, the start of the gating signal from bistable 26 will then coincide with the beginning of the referenced signal information that is desired to be extracted.

In this way, all or any part of the VIR signal may be extracted, readily, conveniently and very accurately, at any location within the designated line interval. It is to be understood that the invention is not limited to just the extraction of the VIR signal from a conventional composite television signal, but can be utilized advantageously in any application where it is desired to extract certain reference information from a base signal. The only operational requirement is that the base signal include recurrent components suitable for counting so as to effect the resultant gating signal to be utilized for extraction purposes.

Accordingly, what is claimed is:

1. A signal extraction circuit arrangement suitable for extracting signal information included at a selectable interval in a base signal having, inter alia, recurrent reference pulse information, which signal extraction arrangement includes in combination:

counter means for counting a selected number of said reference pulses and producing a control signal in response thereto;

means for responding to said reference pulse information and conditioning said counter means to initiate counting action at a prescribed time;

gating means responsive to said control signal of said counter means to permit the extraction of the desired signal information coincident therewith; and timing means coupled with said gating means and responsive to said reference pulse information for selectively adjusting the response of said gating means over a predetermined time interval and thereby varying the amount of signal information being extracted.

2. A signal extraction circuit arrangement suitable for extracting reference signal information from the vertical interval of a composite television signal wherein reoccurring color burst segments are included, which signal extraction arrangement includes in combination:

counter means for counting a selected number of color burst segments and producing a control signal in response thereto;

means for recognizing the absence of color bursts during the vertical interval of the television signal and conditioning said counter means to initiate counting action upon resumption of the occurrence of said color burst segments;

gating means response to said control signal of said counter means to permit the extraction of the reference signal information coincident therewith; and timing means for selectively adjusting the response of said gating means over a predetermined time interval and thereby vary the amount of signal information being extracted.

3. A signal extraction circuit arrangement in accordance with claim 2 wherein said means for recognizing the absence of color bursts includes a peak detector and limiter arrangement together with a retriggerable monostable device having a time period greater than one horizontal line interval as defined by said composite television signal.

4. A signal extraction circuit arrangement in accordance with claim 3 wherein said means for conditioning said counter means for counting includes a further monostable device having a time period greater than the preset count level of said counter means.

5. A signal extraction circuit arrangement in accordance with claim 4 wherein said time means includes means for adjusting the time constant of said further monostable device through an increment corresponding to substantially one horizontal line interval as defined by said composite television signal.

6. A signal extraction circuit arrangement in accordance with claim 4 wherein said gating means includes a bistable device having an output and a pair of inputs coupled respectively to said counter means and to said further monostable device and wherein an analog gate coupled to the output of said bistable device and a further input to which said composite television signal may be applied.

7. A signal extraction circuit arrangement in accordance with claim 2 wherein the activation of said counter means to begin counting is accurately timed to start with the cessation of the associated color burst segment so as to preclude the possibility of any of said color burst segment being extracted while insuring that all of said reference signal information will be extracted.

8. A signal extraction circuit arrangement in accordance with claim 2 wherein the reference signal information to be extracted may be located at any horizontal line interval within the vertical interval following the equalizing pulse interval of the received composite color television signal.

* * * * *